United States Patent [19]

Webb

[11] Patent Number: 4,677,008

[45] Date of Patent: Jun. 30, 1987

[54] SAFE AND EFFICIENT SELF-LUMINOUS MICROSPHERES

[76] Inventor: Robert D. Webb, 3722 Calle Cita, Santa Barbara, Calif. 93105

[21] Appl. No.: 767,106

[22] Filed: Aug. 19, 1985

[51] Int. Cl.[4] .......................... B32B 3/08; B32B 5/16; G08B 7/00

[52] U.S. Cl. ...................................... 428/35; 40/542; 428/325; 428/402; 428/690

[58] Field of Search ...................... 428/690, 325, 402.2, 428/35, 402; 40/542, 545

[56] References Cited

U.S. PATENT DOCUMENTS

| | | | |
|---|---|---|---|
| 4,020,203 | 4/1977 | Thuler | 428/35 |
| 4,383,382 | 5/1983 | Hegarty | 40/545 |
| 4,452,861 | 6/1984 | Okamoto et al. | 428/690 X |
| 4,491,620 | 1/1985 | Joiner, Jr. | 428/690 X |
| 4,574,102 | 3/1986 | Arakana et al. | 428/690 X |

*Primary Examiner*—Thomas J. Herbert
*Attorney, Agent, or Firm*—Harry W. Brelsford

[57] ABSTRACT

This invention relates to a means for more efficiently and more safely providing self-luminous lighting devices for use in signs, markers, indicators and the like. Said invention provides self luminosity by means of a plurality of glass microspheres containing both a light emitting phosphor and a radioactive gas. The "soft" emission of electrons from the beta emitting gas can not penetrate the glass wall of the microspheres, thereby constituting no radiation hazard. The containment of the self-luminous system within an envelope which does not pass any radiation prevents the deterioration of nearby organic materials. A further advantage of said invention is that the plurality of individual containment envelopes minimize the escape of radioactive gas in the event of any physical damage to an assembly of such envelopes. A still further advantage of my invention is that the radioactive gas completely surrounds the phosphor particles, thus causing light emission from 100 percent of the surface of said particles.

6 Claims, 2 Drawing Figures

SECTION AT MID-PLANE
OF SPHERE

SECTION AT MID-PLANE
OF SPHERE

SAFE AND EFFICIENT SELF-LUMINOUS MICROSPHERES

BACKGROUND AND PRIOR ART

Self-luminous signs and indicators have been in use since early in this century and have experienced numerous improvements over the intervening years. The early uses of self-luminosity employed radium as the activator for a phosphor; however, radium constituted a health harazd from its "hard" radiation and was abandoned. In more recent times a number of radio-isotopes have been developed and produced, which serve to activate phosphors to luminescence. Depending upon the choice of isotope, one may obtain alpha, beta or gamma radiation and it has been found that alpha and gamma radiation are hazardous to health, leaving the beta radiators as the safe type for self-luminescence devices. by definition, the beta radiators emit electrons which are relatively heavy particles and exhibit less velocity. This type of radiation will not penetrate a thin glass wall such as is employed in my invention; however, it is effective in cause phosphors to luminesce. Among the beta radiating isotopes, I have selected Tritium as the activator for my device. Tritium exhibits a half-life of 12.5 years, which it quite adequate for the purpose intended. Other isotopes might be used; however, some have small amounts of "hard" radiation and exhibit differing half-lives, such as:

Promethium[147], having a half-life of 2.7 years,
Thallium[204], having a half-life of 3.6 years and
Krypton[85], having a half-life of 10.0 years; however, this isotope yields approximately 0.5% of its radiation in the form of gamma rays.

Other have made various forms of self-luminous devices; however, these have suffered from lack of efficiency for any of the followings causes:

(a) Light being obstructed by the phosphor and the radioactive substance being chemically combined to become a solid.

(b) Light being obstructed or attenuated by having to pass through a layer of phosphor to become visible.

(c) Light being limited by only one side of the phosphor particles being exposed to the radiation.

A further problem with some of the previous devices has been that the phosphor was combined with a binder to allow a film coating on the inside of a glass envelope which contained the radioactive gas. In this instance, not only did the film attenuate the light, but the binder deteriorated with time due to its exposure to the radiation.

Others have made self-luminous paints, wherein the radioactive gas was converted to a solid by chemical combination with a transparent polymer, which was then deposited on phosphor crystals. In this instance, exposure to its own radiation resulted in the tritiated polymer losing gas and the tritiated gas compounds readily diffuse through the polymer, thus resulting in a radiation hazard, as well as to degrade the transparency of the polymer.

Work in the area of self-luminous signs has been done by such companies as American Atomics, Inc., Self Powered Lighting, Inc. and by the Oak Ridge National Laboratories (ORNL). See U.S. Pat. No. 4,383,382 of Self Powered Lighting, Inc. In addition, the 3M company has done considerable work with self-lumination; however, their means invole the hazard and light attenuation problems described above.

NASA's Jet Propulsion Laboratory has done work with the confinement of atomic waste materials in glass envelopes and in a manner similar to that described herein; however, they employed a standard method of forming glass spheres and they were not concerned with self-luminescence. No phosphors were involved with their work.

DESCRIPTION

My invention obviates the problems described in the foregoing approaches to self-luminosity by confining the radioactive material within a glass walled sphere, along with the light emitting phosphor in such manner that the emitted light does not have to pass through any light attenuating medium.

Though numerous radioactive gases might be employed, I choose to use Tritium gas as the activator for the light emitting phosphor. Tritium is a "soft" beta emitter and the radiation will not penetrate the glass wall of the envelope. The clear borosilicate glass microsphere offers no appreciable attenuation of the emitted light.

The formation of glass microspheres is a well known art and is widely used in providing strong, light-weight fillers for epoxies and the like. Also well known is the art of filling said microspheres with a gas, since the gas pressure is fundamental to the formation of the hollow spheres.

Figure 1:
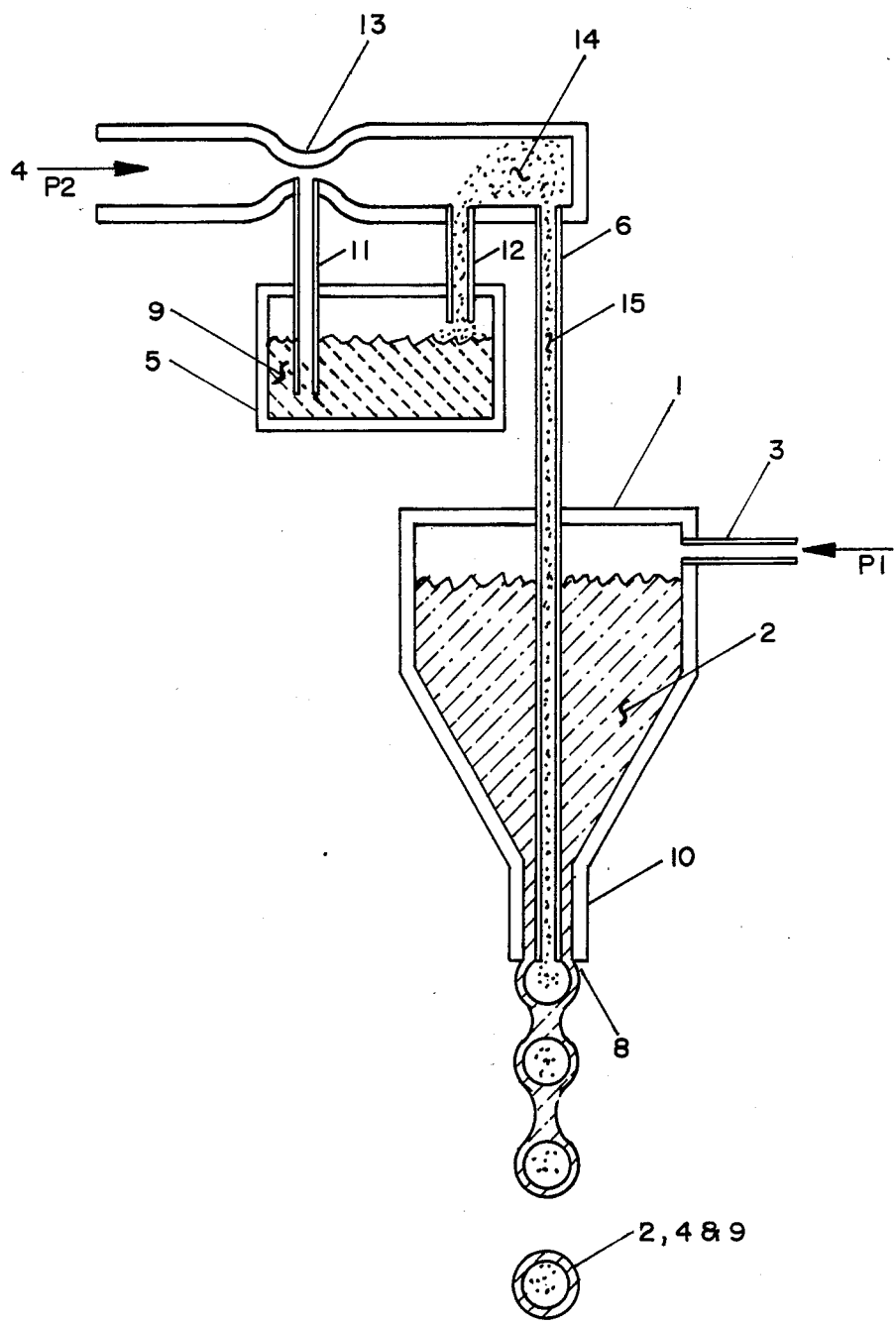
FIG. 1 illustrates apparatus used in the process of forming the gas filled microspheres of the invention.

In my invention the standard method of forming gas filled microspheres is modified to employ Tritium gas and to employ the pressure of said gas to insert the light emitting phosphor particles into each microsphere. The process for this insertion is best illustrated by referring to FIG. 1, where a crucible (1) containing molten glass (2) is necked down to form a funnel (10) at its bottom. Concentric with the funnel (10) and of a smaller diameter is a capillary tube (6) extending upward from the plane of the end of the funnel (10) to a chamber (14). A gas inlet (3) conducts a gas at a suitable pressure (P1) to regulate the flow of molten glass throug the annular area (8) between the funnel (10) and the capillary tube (6). The Tritium gas (4) is fed under pressure (P2) to a venturi section (13) where a tube (11) feeds a relatively high pressure to a chamber (5) containing particles of phosphor (9).

A second tube (12) is located beyond the venturi section (13) at a relatively low pressure area and extends downward into the upper portion of chamber (5) which contains the stock of phosphor particles (9). The pressure differential between the two tubes (11) and (12) results in a relative vacuum in the chamber (14), causing the phosphor particles (9) to rise into the chamber (14) where the flow of the Tritium gas (4) sweeps them into the capillary tube (6), forming a mixture of phosphor particles and Tritium gas (15) which forms the filler for the gas microspheres being formed at (8). The completed, filled microsphere (4), (2), (9) are shown as they separate from the annular area at the bottom of the ·equipment. FIG. 1 is schematic only and does not represent the actual proportions of the components of the system. The pressure of the Tritium gas may be pulsed to aid in forming the microspheres.

Figure 2:
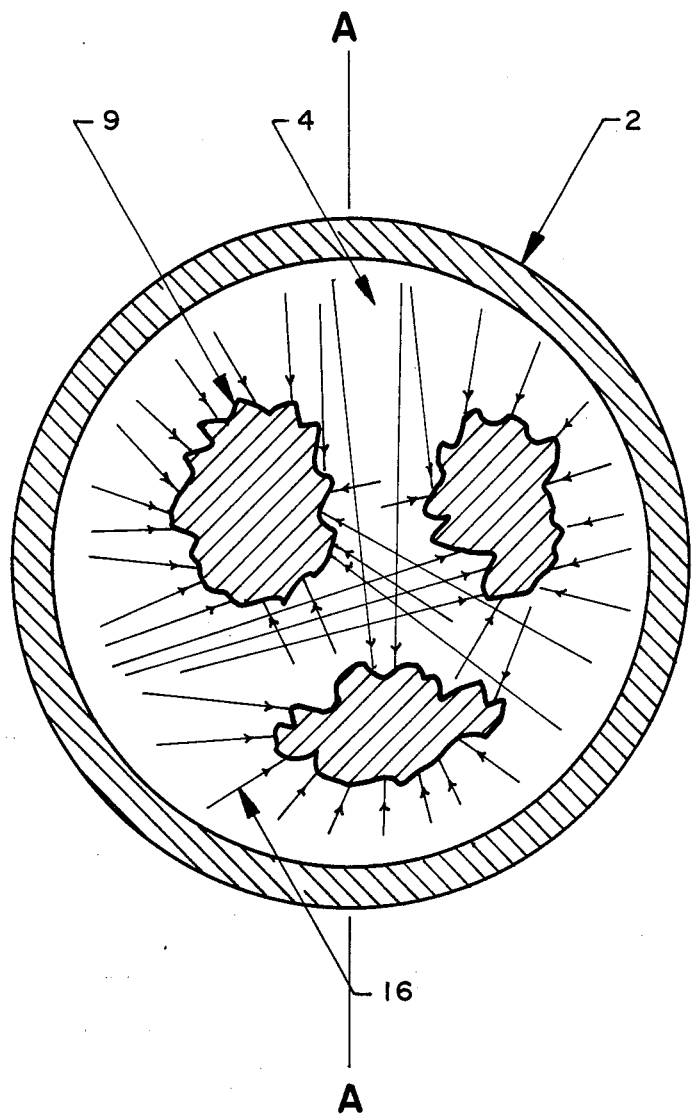
FIG. 2 shows envelope containing phosphor particles and radioactive gas in full section.

Referring to FIG. 2, it will be noted that the radioactive gas (4) surrounds the phosphor particles (9) within the glass envelope (2), thus exposing the light emitting phosphor to radiation (16) from all sides, thus increasing the efficiency of light generation. FIG. 2 shows the phosphor particles (9) in a somewhat ideal dispersal; however, even when more closely packed, the 100% exposure to the radiation remains valid.

A plurality of particles of FIG. 2 may be disposed on a surface to form signs, markers, indicators and the like. A plurality of particles of FIG. 2 may be disposed in a transparent binder to form a luminous paint.

What I claim is:

1. A self-luminous microsphere comprising:
(a) a gas tight envelope;
(b) a radio-active gas confined within the envelope; and
(c) at least one phosphor particle disposed within the envelope and responsive to the radiation from said gas to become luminous, characterized by said particle being loose within the envelope to thereby receive radiation on all sides.

2. A self-luminous microsphere as set forth in claim 1 wherein the gas is tritium.

3. A self-luminous microsphere as set forth in claim 1, wherein the gas is at a pressure greater than atmospheric pressure.

4. A plurality of microspheres as set forth in claim 1 disposed on a flat surface to act as a sign.

5. A plurality of microspheres as set forth in claim 1 disposed in a transparent binder to form a luminous paint.

6. A self-luminous microsphere comprising:
(a) a gas tight envelope;
(b) a radio-active gas confined within the envelope; and
(c) at least one phosphor particle disposed within the envelope and free to move within the envelope, and responsive to radiation from said radio-active gas to become luminous.

* * * * *